(12) United States Patent
Chinnel et al.

(10) Patent No.: US 10,962,444 B2
(45) Date of Patent: Mar. 30, 2021

(54) BELT DRIVE MONITORING SYSTEM

(71) Applicant: GATES CORPORATION, Denver, CO (US)

(72) Inventors: Kane Chinnel, Edgewater, CO (US); John Ragan, Firestone, CO (US); Baron Sanders, Englewood, CO (US); Leslee Brown, Broomfield, CO (US); Vladislav Soukhovei, Thornton, CO (US)

(73) Assignee: Gates Corporation, Denver, CO (US)

( * ) Notice: Subject to any disclaimer, the term of this patent is extended or adjusted under 35 U.S.C. 154(b) by 11 days.

(21) Appl. No.: 16/183,124

(22) Filed: Nov. 7, 2018

(65) Prior Publication Data

US 2019/0137358 A1    May 9, 2019

Related U.S. Application Data

(60) Provisional application No. 62/583,659, filed on Nov. 9, 2017.

(51) Int. Cl.
*G01M 13/02* (2019.01)
*F16H 7/02* (2006.01)
(Continued)

(52) U.S. Cl.
CPC ......... *G01M 13/023* (2013.01); *F02B 77/081* (2013.01); *F16H 7/02* (2013.01); *B65G 43/02* (2013.01)

(58) Field of Classification Search
CPC F16H 7/00; F16H 7/02; G01M 13/02; G01M 13/023; F02B 77/08; F02B 77/081
See application file for complete search history.

(56) References Cited

U.S. PATENT DOCUMENTS 5,426,362 A * 6/1995 Ninnis ................. G01N 27/82
324/235
6,523,400 B1 * 2/2003 Ahmed ............... G01M 13/023
73/114.77
(Continued)

FOREIGN PATENT DOCUMENTS

JP      59140954 A     8/1984
WO      02079747 A2    10/2002
WO      2015042661 A2  4/2015

OTHER PUBLICATIONS

Sensonics Ltd., Techniques for the Monitoring & Protection of Power Plant Equipment, Turbine Supervisory Guide, Sensors & Systems, Protecting Your Investment, pp. 1-28,Berkhamstad, Hertfordshire, England.
(Continued)

*Primary Examiner* — Huy Q Phan
*Assistant Examiner* — David B Frederiksen
(74) *Attorney, Agent, or Firm* — Alyssa K. Sandrowitz, Esq.

(57) ABSTRACT

A belt drive monitoring system comprising a driver, a driven, the driver and driven connected by an endless member, a first magnetic member having a magnetic field attached to the driver, a second magnetic member having a magnetic field attached to the driven, a first sensor disposed to detect a changing magnetic field caused by passage of the first magnetic member, a second sensor disposed to detect a changing magnetic field caused by passage of the second magnetic member, a first transmitter configured to wirelessly transmit to a receiver a first data signal from the first sensor and a second transmitter configured to wirelessly transmit to the receiver a second data signal from the second sensor, and
(Continued)

the receiver configured to manipulate the data signal whereby a system parameter is calculated and provided to a user.

8 Claims, 3 Drawing Sheets

(51) Int. Cl.
    *G01M 13/023*      (2019.01)
    *F02B 77/08*      (2006.01)
    *B65G 43/02*      (2006.01)

(56) References Cited

U.S. PATENT DOCUMENTS

| | | | | |
|---|---|---|---|---|
| 8,074,789 | B2* | 12/2011 | May | B65G 43/02 |
| | | | | 198/502.1 |
| 8,312,987 | B2* | 11/2012 | Lynn | G01M 13/023 |
| | | | | 198/810.02 |
| 8,662,290 | B2 | 3/2014 | Twigger et al. | |
| 8,955,394 | B2 | 2/2015 | Voss et al. | |
| 9,260,903 | B1 | 2/2016 | Piechocki | |
| 2001/0045835 | A1* | 11/2001 | Ahmed | G01R 15/18 |
| | | | | 324/526 |
| 2010/0035721 | A1* | 2/2010 | Rothenbuhler | F16H 61/66272 |
| | | | | 477/45 |
| 2011/0133723 | A1* | 6/2011 | Forsyth | G01D 5/145 |
| | | | | 324/207.2 |
| 2011/0316525 | A1 | 12/2011 | Lynn | |
| 2016/0007526 | A1* | 1/2016 | Greulich | F16H 7/08 |
| | | | | 56/10.2 R |

OTHER PUBLICATIONS

D.N. Brown Bruel & Kjaer, application notes, Machine-Condition Monitoring Using Vibration Analysis, A Case Study from a Nuclear Power-Plant, pp. 1-12, K. Larsen & Son A/S, Denmark.

European Patent Office, International Search Report and Written Opinion of the International Searching Authority, International application No. PCT/US2018/059650, dated Feb. 22, 2019.

* cited by examiner

BELT DRIVE MONITORING SYSTEM

REFERENCE TO RELATED APPLICATIONS

This application claims priority from U.S. provisional application Ser. No. 62/583,659 filed Nov. 9, 2017.

FIELD OF THE INVENTION

The invention relates to a belt drive monitoring system, and more particularly, to a belt drive monitoring system comprising non-contact sensors and wireless transmission of data signals to determine a system operating condition.

BACKGROUND OF THE INVENTION

Belt drives are replacing a significant number of problematic roller chain drives due to performance and cost advantages. When designing belt drives to replace roller chain drives, traditional drive design procedures may yield drives with greater than needed capacity. Because the actual running load may or may not be known, the following three approaches are used to determine an appropriate design load: use the actual load when available; estimate the load with measurements; use the power rating of the existing roller chain drive to calculate a drive design load. In order to prevent over-sizing belt drives, the design should be based upon the actual system running load, estimation techniques lead to lost capacity.

Belt drives are often difficult to access. Monitoring the belt and drives is inconvenient and costly. Guarding has to be removed, machine down-time is incurred, inspection is limited to visual clues on belt condition. Furthermore, these belt drives may be situated in remote locations where inspection is hindered. A convenient means of probing the belt and belt drive performance characteristics would be useful for flagging eminent failure, determining service life, and scheduling maintenance.

Representative of the art is U.S. Pat. No. 8,662,290 which discloses a conveyor belt monitoring system that uses sensors to measure magnetic disruptions ("events") in a conveyor belt which are indicative of one or more splice joints, rip panels and reinforcing cord damage. The system may comprise a plurality of sensing components, including coils or Hall effect sensors for sensing rip panels, splices and generalized reinforcing cord damage. The system may also have RFID-based rip panels and may use RFID chips to identify various belt components. A PLC-based control system may communicate with the aforementioned components via an Ethernet link. Data received by the control system is used to chart belt wear and damage trends and to provide user alarms when signal levels exceed predetermined norms. The system may stop the belt when imminent belt failure is predicted. The PLC-based control system is scalable and will integrate easily into existing conveyor control systems and facility-wide monitoring systems.

What is needed is a belt drive monitoring system comprising non-contact sensors and wireless transmission of data signals to determine a system operating condition. The present invention meets this need.

SUMMARY OF THE INVENTION

An aspect of the invention is to provide a belt drive monitoring system comprising non-contact sensors and wireless transmission of data signals to determine a system operating condition.

Other aspects of the invention will be pointed out or made obvious by the following description of the invention and the accompanying drawings.

The invention comprises a belt drive monitoring system comprising a driver, a driven, the driver and driven connected by an endless member, a first magnetic member having a magnetic field attached to the driver, a second magnetic member having a magnetic field attached to the driven, a first sensor disposed to detect a changing magnetic field caused by passage of the first magnetic member, a second sensor disposed to detect a changing magnetic field caused by passage of the second magnetic member, a first transmitter configured to wirelessly transmit to a receiver a first data signal from the first sensor and a second transmitter configured to wirelessly transmit to the receiver a second data signal from the second sensor, and the receiver configured to manipulate the data signal whereby a system parameter is calculated and provided to a user.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
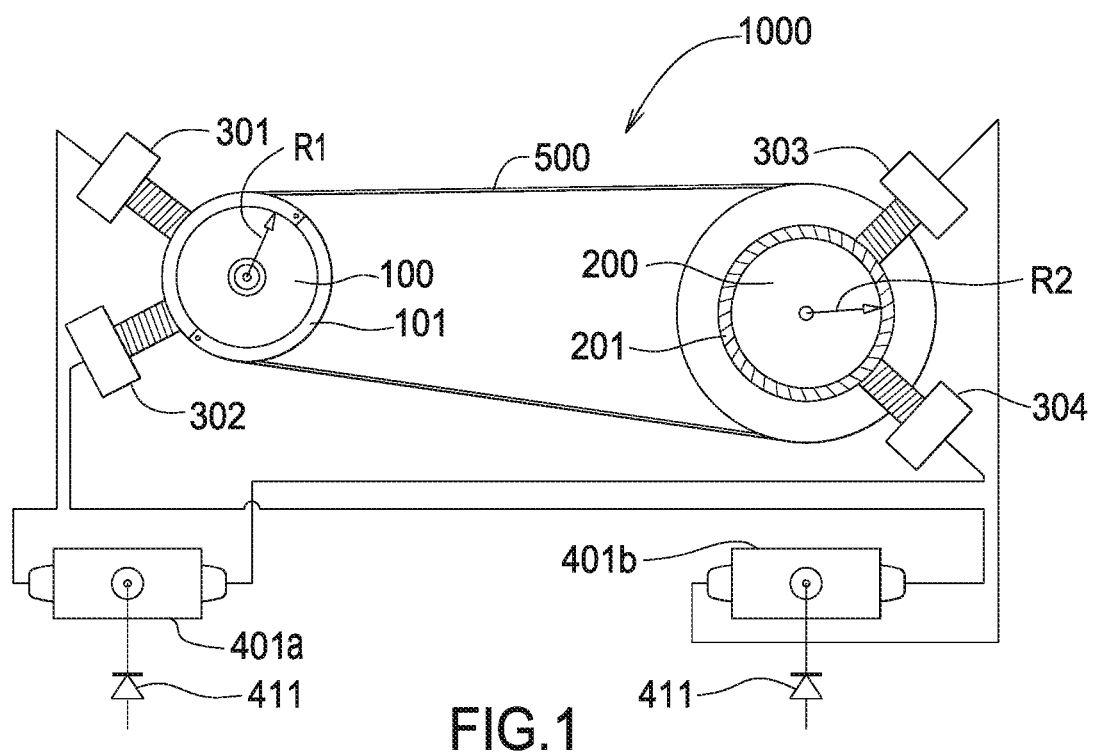
FIG. 1 is a general arrangement of the inventive system.

The invention comprises a non-contact, wireless, rotational speed performance monitoring system for a belt drive. The system comprises a driver pulley 100 and a driven pulley 200. An endless belt 500 is engaged between the driver and driven pulley.

A plurality of magnets 101 are arranged about a perimeter of driver pulley 100. Each magnet is placed on a predetermined spacing between each adjacent magnet. The magnets are placed at a radius R1 from the axis of rotation.

A plurality of magnets 201 are arranged about a perimeter of driven pulley 200. Each magnet 201 is placed on a predetermined spacing between each adjacent magnet. The magnets are placed at a radius R2 from the axis of rotation.

Two Hall effect sensors 301, 302 are oriented to detect passage of each magnet 101 on driver pulley 100. Two Hall effect sensors 303, 304 are oriented to detect passage of each magnet 201 on driven pulley 200.

Hall effect sensors 301, 302, 303 and 304 are IP65 rated proximity sensors.

Figure 2:
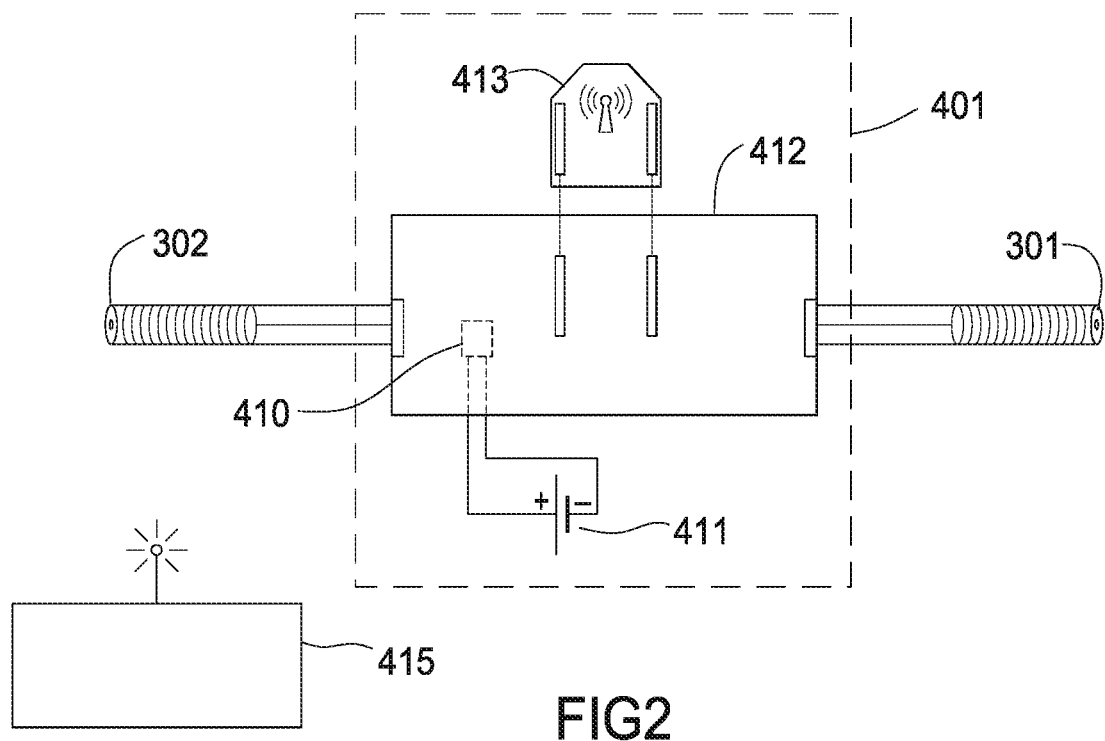
FIG. 2 is a detail of the sensor node.

FIG. 2 is a schematic of the sensor circuit enclosure. Sensor circuit enclosures 401a and 401b are identical and include a battery 410 and/or a 120 v source 411 to power the circuit 412. Circuit 412 comprises a base station (Intel chip) connected to an RF radio module 413, suitable for a low-power, low-cost application. Use of an XBee® RF radio for module 413 and Intel chip is by way of example and is not intended to limit the scope of the invention. Each Hall effect sensor 301, 302 and 303, 304 is connected to a chipset 412 in each circuit enclosure 401. Each circuit 412 along with the connected sensors 301, 304 and 302, 303 are also referred to as a sensor node.

In operation, as the magnetic field from each magnet 101, 201 passes each respective Hall effect sensor 301, 302 and 303, 304 in a given sequence a voltage signal is pulled high (magnetic north pole) or low (magnetic south pole), which triggers a voltage pulse to the digital input of the microcontroller. During normal drive operation, the sequence of pulses describes a square waveform. The Hall effect sensors that are attached to each sensor node 401a, 401b, have synchronized parallel sampling to reduce rotation speed sampling error due to the two different wave forms coming into the microcontroller. The sampling method also ensures that the integrity of the wave form data from one Hall effect sensor to the other is for the same specific instance of time and sampling period.

The time interval between the each pulse is recorded in a firmware register and used in a rolling average to calculate the rotation speed of each shaft 100, 200 of the drive.

Similarly, the voltage signal from the battery 410 is connected to an analog input of the microcontroller, thereby allowing a user to gauge the remaining power available before recharging or changing of the power supply is needed.

The sensor node and firmware code include sensor sleep functionality to conserve battery power for longer operational intervals before batteries need recharging or change. A 120 v source is available if a user requires a more permanent and reliable power source.

After digital signal sampling from each Hall effect sensor and raw data buffer storage, the system rotational speed and battery calculations are performed. The microcontroller then packages the data, along with sender MAC address information for location and ID information. The message is sent wirelessly via PAN radio 413 as a checksum based serial message out to a base station receiver module 415 via Personal Area Network (PAN).

When the wireless message from each RF radio 413 is received by the base station 415, the base station places the data into a raw data buffer where the message can be asynchronously read by a parsing loop. When the processor on the base station is idle, the raw data buffer message is parsed to verify the correct security checksum and data bits for the message size. After the data verification, the base station places the timestamps on when the data was received, breaks apart the serial message into usable information, and sends the verified data to the saveData( ) and sendData( ) functions.

The saveData( ) function then saves the data to an internal database file resident on the base station 415. This database can be used as a long term data historian wherein sensor data can be store up to several months for each sensor connected to base station via the PAN.

Separate database tables store each sensor node ID and a user settings page which corresponds to that unique sensor node ID. Other static user input data that is saved can include user defined belt and drive names, drive geometry, belt installation date, belt product number, sensor time out warning time, user set drive efficiency warning limit, and user set drive efficiency alarm limits. Other data may be added as required by a user.

From the static user input data that is saved in the settings database table, calculations can be made for different types of alarms. These calculations can include speed difference (speed delta), slip percentage, drive efficiency, belt usage in hours of operation, sensor timeout warning from last message received, battery level warnings and alarms, and the drive efficiency warnings and alarms. Speed difference is the difference in speed between each shaft 100, 200. A slip percentage can be calculated using the speed difference between shafts connected by the same belt. Drive efficiency can be calculated using speed in and speed out with respect to the drive ratio.

In the single RPM sensor use, the measured sensor data coming into the base station is compared to the known user input values for the driver speed and speed ratio, the slippage of the system is calculated, and then compared to the user input alarm and warning limits. During the dual RPM sensor use, the data from each Hall effect sensor node is compared to one another to give slip values and drive efficiency.

The alarm set point option allows a user to calibrate the RPM system to meet individual needs. It can also visually warn the user if the drive efficiency is not performing as expected, or if the battery is low. A web page User Interface (UI) alarm display can flash to a red or yellow color indicating that the drive is in either alarm or warning mode.

After the saveData( ) function has transformed and saved the serial data into usable information for the front end of the base station server, the data is then used in the sendData( ) function where it can be repackaged into two different, but specific types of messages; one type of message is the base station local webserver message, and the other is a standard data protocol (JSON) message that will be sent to the cloud, if the cloud option has been enabled.

The locally hosted webpage on the webserver, is a User Interface where a user can access the sensor node data, enter specific drive data, and set the alarm and warning thresholds. The webpage is accessed using a network/intranet TCP/IP protocol. So as long as the base station 412 is connected on the same network as the user's computer or phone, the user will have access to the monitoring system. The alarms and warnings page is always active and if any system events occur while monitoring the alarms and warnings will appear as yellow rows for warnings and red rows for alarms.

Figure 3:
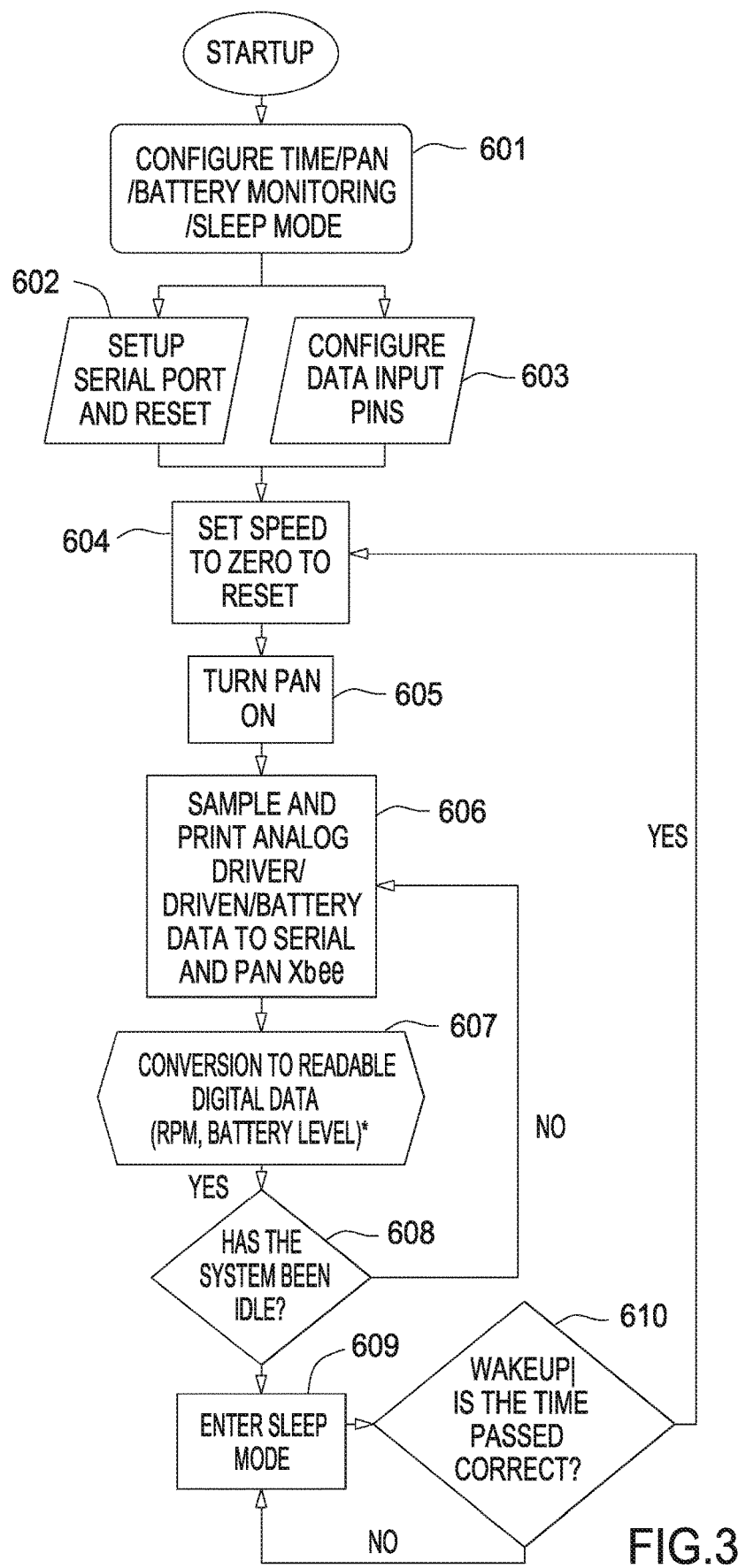
FIG. 3 is a dual speed sensor flowchart.

FIG. 3 is a dual speed sensor flowchart. Step 601 configures the time, PAN, battery monitoring and sleep mode. Software will provide configuration settings for the wireless radio 413 in order to specify the type of data that will be received, the format of the data (Hexadecimals), and the identification number of the RF radio that will be sending data. The system defines variables that will be used in calculations involving time, speed, and battery life.

Step 602 sets up the serial port and resets/configures the data input pins 603. Run commands that will enable the use of the serial port and reset it to clear any data to avoid outputting residual data/incorrect output from the serial port. Pins on an Arduino board will be setup to either be inputs or outputs as this is required to transfer data from one piece of hardware to another.

Step 604 sets the speed to zero to reset. This step sets all speed variables to zero to prevent miscalculation in the program for the driver and driven speed calculations. This is the equivalent of "taring" or "zeroing" the system.

Step 605 is to turn on the PAN. This comprises waking up the RF radio 413 and turn on all pins on the hardware.

Step 606 is to sample and print the analog driver/driven/battery data to serial and PAN. Chip 412 pins sample data by reading voltages from the sensors.

Step 607 is conversion to readable digital data and to send the data to the RF radio PAN and serial port. RPM calculations are executed with respect to time passed and the number of detected drive revolutions. This occurs for both the driver and the driven. The battery, driver, and driven data is then sent to the server via the RF radio 413. This message is formatted according to the configurations performed in step 601.

Step 608 queries whether the work is complete. Once the RF radio internal software library has verified the data, the system will go to sleep 609 by turning off the RF radio and all input/output pins. If the data is not verified or is incorrect, the sampling and conversion process will be repeated. If a predetermined time interval has passed 610, turn the system back on and perform steps 604 to 609.

Figure 4:
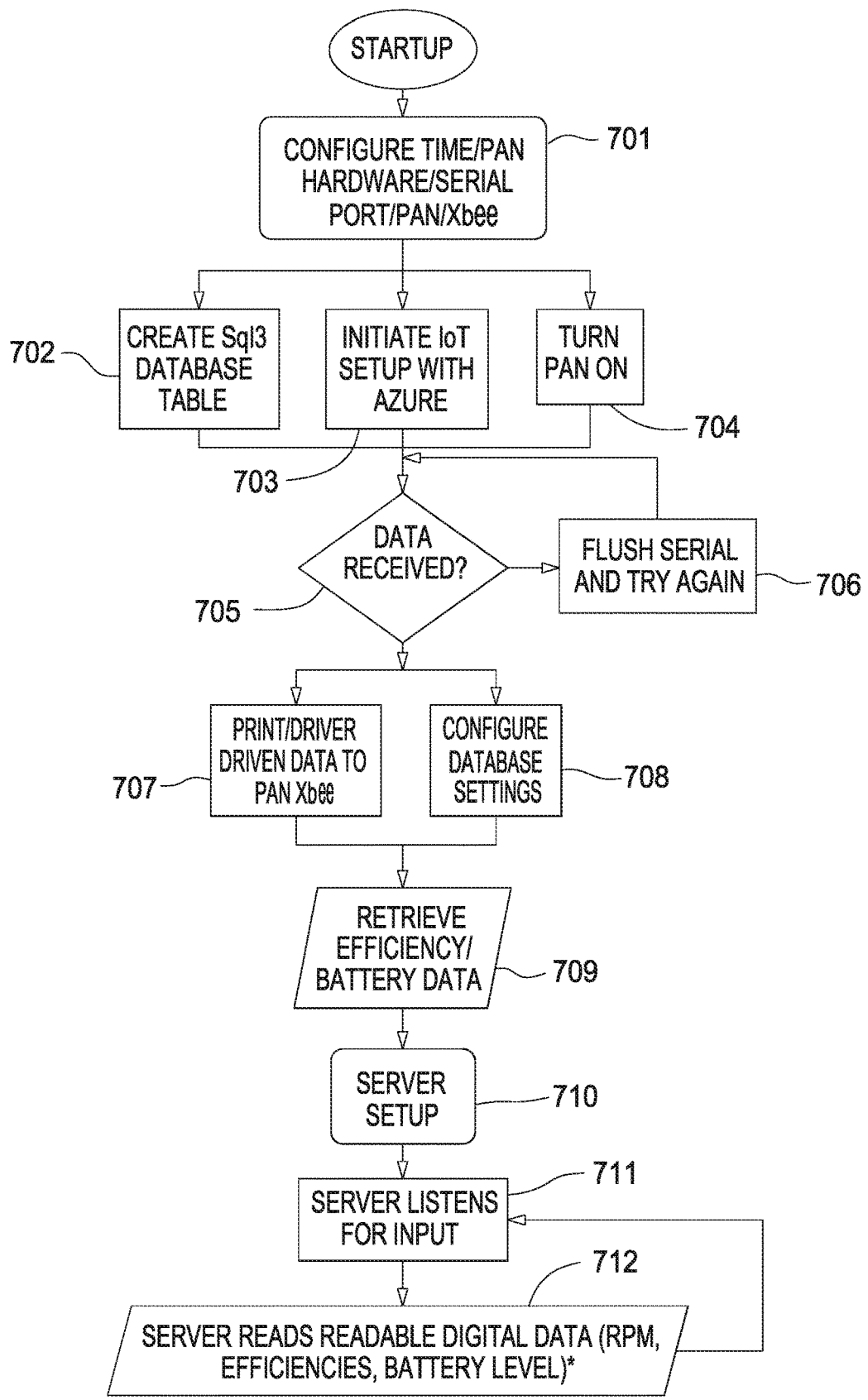
FIG. 4 is a server flowchart.

FIG. 4 is a server flowchart. Step 701 comprises configuring the hardware, serial port, PAN and RF radio. Commands are run to allow usage of the serial port and properly configure the serial port to output data for debugging purposes. Commands are also run to enable the use of the RF radio 413 module as well as its data parser, which will verify the data and translate it into readable data. This parser is available from the RF radio.

Steps 702, 703 and 704 create the SQLite database and tables, initiate IoT setup with the cloud, and open the serial port data. Create a new SQLite database and create tables for Hall effect sensors and sensor settings using commands specific to javascript to link with SQLite. Variables are denoted for use with the cloud platform. Connectivity is tested between the sensor system and the cloud by pinging sample messages between the Intel base station board 412 and the cloud 705. Open serial port communication, flush the serial port 706 in order to avoid any incorrect data/ remove old data, and then verify that data from the RF radio is in the proper format.

Step 707 is to print driver and driven data to the PAN and RF radio.

Step 708 is to configure database settings and to save those settings. Send the following data from the system and Hall effect sensors by slicing the hexadecimal message that the RF radio sends to the base station hardware into readable data, including, date, time, which part of the system is ending a given packet of data, what type of data is being sent, driver speed and driven speed. The SQLite database is setup in preparation to receive data by creating a variable and pathway for the hardware to send data.

Step 709 is to retrieve efficiency and battery data. Slice up the remaining pieces of data from the RF radio message data format and calculate efficiencies and battery life data.

Step 710 is server setup. The serial port will open the SQLite database and the server will begin to listen for data.

In step 711 the server listens for input. All information gathered from steps 702 to 709 are inserted into the SQLite table that was setup in step 702.

The server then receives digital data including speed, sensor sender address, and battery level in step 712. Appropriate warnings and alarms are sent as needed. Output graphs and predictive analytics information is sent to the user interface. Sensor data and user settings are read from and written to the SQLite database. This is visually confirmed and is the result of the successful execution of step 708. Any warnings or alarms that are sent out are messages displayed based on logic statements. For example, if battery life is below a certain value, a warning will be output to the system that will include a display of the current battery life thereby alerting the user through the website interface that a warning regarding battery life has been issued. Using data read from the tables within the SQLite database, a graph can be generated to provide a visual history and trend of the current system's performance in order to facilitate the user's analysis.

Although a form of the invention has been described herein, it will be obvious to those skilled in the art that variations may be made in the construction and relation of parts without departing from the spirit and scope of the invention described herein.

We claim:

1. A belt drive monitoring system comprising:
   a driver;
   a driven;
   the driver and driven connected by an endless member;
   a first plurality of magnetic members having a magnetic field attached to the driver at a first radius from an axis of rotation of the driver with a first predetermined spacing;
   a second plurality of magnetic members having a magnetic field attached to the driven at a second radius from an axis of rotation of the driven with a second predetermined spacing;
   a first sensor disposed to detect a changing magnetic field caused by passage of the first plurality of magnetic members;
   a second sensor disposed to detect a changing magnetic field caused by passage of the second plurality of magnetic members;
   a first transmitter configured to wirelessly transmit to a receiver a first data signal from the first sensor and a second transmitter configured to wirelessly transmit to the receiver a second data signal from the second sensor; and
   the receiver configured to manipulate the first date signal and the second data signal whereby a system parameter is calculated and provided to a user.

2. The belt drive monitoring system as in claim 1, wherein the endless member comprises a belt.

3. The belt drive monitoring system as in claim 1, wherein the first sensor and the second sensor each comprise a Hall effect sensor.

4. The belt drive monitoring system as in claim 1 further comprising:
   a third sensor disposed to detect a changing magnetic field caused by passage of the first plurality of magnetic members; and
   a fourth sensor disposed to detect a changing magnetic field caused by passage of the second plurality of magnetic members.

5. The belt drive monitoring system as in claim 4, wherein the third sensor and the fourth sensor each comprise a Hall effect sensor.

6. The belt drive monitoring system as in claim 5, wherein the first transmitter is configured to wirelessly transmit to the receiver a third data signal from the third sensor and the second transmitter is configured to wirelessly transmit to the receiver a fourth data signal from the fourth sensor.

7. The belt drive monitoring system as in claim 1, wherein the system parameter comprises one of a speed difference, a slip percentage or a drive efficiency.

8. The belt drive monitoring system as in claim 6, wherein the system parameter comprises one of a speed difference, a slip percentage or a drive efficiency.

* * * * *